United States Patent [19]

Shane et al.

[11] Patent Number: 4,867,095
[45] Date of Patent: Sep. 19, 1989

[54] DIFFERENTIAL PRESSURE INDICATOR

[75] Inventors: Bruce E. Shane, Metamora, Ohio; Keith D. Leady, Morenci, Mich.; Wayne L. Conner, Perrysburg; Albert F. Cella, Sylvania, both of Ohio

[73] Assignee: Parker Hannifin Corporation, Cleveland, Ohio

[21] Appl. No.: 177,710

[22] Filed: Apr. 5, 1988

[51] Int. Cl.⁴ .............................................. G01D 5/12
[52] U.S. Cl. ..................... 116/204; 116/221; 116/267; 116/DIG. 25; 116/DIG. 42
[58] Field of Search ............... 116/267, 266, 272, 204, 116/216, 221, DIG. 42, DIG. 25, 220, 281, 283; 200/153 LA; 210/90

[56] References Cited

U.S. PATENT DOCUMENTS

| | | | |
|---|---|---|---|
| 2,942,572 | 6/1960 | Pall | 116/267 |
| 3,064,618 | 11/1962 | Scavuzzo | 116/DIG. 42 |
| 3,077,854 | 2/1963 | Pall | 116/267 |
| 3,212,471 | 10/1965 | Willis | 116/267 |
| 3,232,266 | 2/1966 | Levesque | 116/DIG. 42 |
| 3,364,897 | 1/1968 | Mouwen | 116/DIG. 42 |
| 3,402,690 | 9/1968 | Willis | 116/220 |
| 3,442,248 | 5/1969 | Parkinson et al. | 116/267 |
| 3,595,200 | 7/1971 | Cilento | 116/267 |
| 3,841,259 | 10/1974 | Parkinson et al. | 116/267 |
| 3,873,795 | 3/1975 | Leighton et al. | 200/153 LA |
| 4,029,042 | 6/1977 | Juhasz | 116/267 |
| 4,172,971 | 10/1979 | Silverwater et al. | 116/221 |
| 4,729,339 | 3/1988 | Whiting | 116/267 |
| 4,745,876 | 5/1988 | Whiting | 116/267 |

FOREIGN PATENT DOCUMENTS 217789 10/1961 Austria ..................... 116/DIG. 25

Primary Examiner—William A. Cuchlinski, Jr.
Assistant Examiner—Jeffrey Hohenshell
Attorney, Agent, or Firm—Ralph E. Jocke

[57] ABSTRACT

A cartridge style, pop up, differential pressure indicator includes a threaded body member, a cover structure and a cylindrical indicator button, which carries a magnet at its lower end, and is slidably supported in the cover for movement between a depressed, hidden position and an extended indicating position. The button is engaged at one side by a leaf spring which in the depressed position urges a lip on the button under a ledge in the cover to serve as a detent. A piston slidably supported in the body is subject to differential fluid pressures and carries a magnet at its upper end, poled in a manner to repel the magnet in the indicator button to urge the latter against the bias of the detent spring and upwardly to the extended, indicating position. A semicircular bimetal strip supported in the cover engages the detent spring at lower temperatures to prevent false release of the indicator button due to cold weather, high fluid viscosity situations.

13 Claims, 4 Drawing Sheets

DIFFERENTIAL PRESSURE INDICATOR

BACKGROUND OF THE INVENTION

This invention relates to an improved differential pressure indicator for hydraulic fluid filters and the like and more particularly to a magnetically operated pop up type indicator.

In the past, many different forms of magnetic pressure indicators have been used for the sensing of differential fluid pressure of a particular value in a fluid system and for providing a visual indication of this condition. Many of these devices are of simplified construction suited for application in existing filter structures and the like.

One example of prior art device is shown in U.S. Pat. No. 2,942,572 wherein magnet elements are housed in a piston responsive to fluid pressure and in an indicator mechanism magnetically coupled to the piston. This prior art showing is typical of many of these devices in that the magnets are oriented in a common direction so that an attraction therebetween takes place, typically to retain the indicator in a recessed position. As differential fluid pressure increases due to the clogging of a filter element or the like, the piston is moved downwardly against the bias of a coil spring and allows the indicator to be released and to be moved to a visible position by means of the bias exerted by a second coil spring. In this apparatus a bimetal strip is employed to prevent movement of the indicator at low temperature levels when, due to the high viscosity of the fluid, transient excessive differential fluid pressures might be realized.

A similar form of device is shown in U.S. Pat. No. 3,442,248 wherein a simplified button structure is housed in a threaded body member suited for placement in a typical fluid filter or the like. In this apparatus the indicator button is retained in a retracted position by the force of a fixed permanent magnet in the body which resists the bias of a coil spring urging the indicator button outwardly. In this apparatus the piston is formed also of magnetically attractable material and when it is moved to a position adjacent the magnet due to an increase in fluid pressure acting thereon, the piston will draw off sufficient magnetic flux such that the button spring will overcome the magnetic holding force and cause the indicator to pop outwardly of the body. Also in this apparatus a thermal assembly, comprising a bimetal strip, is employed to prevent movement of the indicator button at low temperature levels.

Another similar form of indicator is shown in U.S. Pat. No. 3,595,200 where again a fixed permanent magnet is employed to retain an indicator button in the retracted position against the bias of a coil spring. Several techniques are shown in this reference for moving a piston or similar structure adjacent the permanent magnet to draw off part of the magnetic flux and allow the indicator button to be released in a manner similar to that previously described.

A still further form of differential pressure indicator is shown in U.S. Pat. No. 4,029,042. Here a pair of magnets are used, one being fixedly attached at the top of the housing and the second affixed to the lower portion of an indicator button. The magnets are arranged in a common direction to provide attractive force therebetween. However, the indicator button is retained in the lower portion of its housing against an inner wall therein, being attracted by a piston formed of magnetic material. As the piston is moved downwardly due to an increase in fluid pressure the lower magnet will lose its keeper mechanism and will be attracted by the fixed upper magnet to move the indicator to an exposed position. This apparatus also employs a bimetallic element which contracts or expands at different temperature levels to allow or prevent movement of the indicator button.

In many of the prior art devices means such as the bimetal strip are often employed to prevent false indications of the pop up type indicator. These false indications are due not only to high viscosity fluid conditions but are often occasioned by vibratory conditions or the like where forces can cause the indicator to be released from its latching mechanism. The types of prior art devices which are activated by coil springs or which rely on magnetic attractive forces are particularly susceptible to these vibration problems inasmuch as once released from a stable position an automatic movement to the extended visual position occurs. Typically, in these devices the stable position is somewhat sensitive in that a close balance must be achieved between operating spring forces, magnetic attraction forces and the like.

SUMMARY OF THE INVENTION

Accordingly, it is an object of the instant invention to provide an improved differential pressure indicator device which is less susceptible to vibratory influences as well as low temperature induced transient conditions which might falsely activate the indicator device. Further, a simplified structure is provided which relies on a single coil spring for retaining the piston mechanism in a deactuated position and which utilizes a leaf spring in association with the indicator device. Further, a minimum of components are required to achieve this construction in which no extremely critical dimensions are required.

This is achieved in apparatus which includes an aluminum body member threaded to be received in fluid filter apparatus and the like and which includes a central bore therein housing a piston subject to differential fluid pressures. The piston preferably formed of plastic material (preferably tetraflouroethylene (TFE) fluorocarbon polymers or fluorinated ethylene-propylene (FEP) resins, generally sold under the trademark TEFLON) and includes an integral lip seal at the lower end thereof in an economical, reliable construction. The piston is biased downwardly in the bore by means of a coil spring and carries a permanent magnet upon an extension at its upper end which therefore moves toward and away from a thin wall section at the end of the central bore. A plastic cover structure is snap fit on the body member and houses an indicator button slidable in a bore therein between a retracted hidden position and an extended visible position. The indicator button is a cylindrical member carrying a permanent magnet at the lower end thereof which in the retracted position is disposed closely adjacent the thin end wall portion of the body. In this position the indicator button is cocked laterally by a detent spring of the leaf spring type so that a flange at the lower end of the indicator button is forced under a ledge in the sidewall of the cover bore. As differential fluid pressure increases upon the piston to move it upwardly in the body bore, the oppositely poled permanent magnets will create a large repulsion force urging the indicator button initially to an aligned position in the cover bore against the bias of the leaf spring thereby releasing the flange from the shoulder in the bore. Thereafter, the indicator button is moved upwardly to a fully extended position primarily by the repulsion action of the permanent magnets. The indicator button is retained in the upper position by the magnetic force or, if the piston is moved downwardly upon dissipation of the differential fluid pressure, by abutment with the leaf spring which has moved into the path of travel thereof. The indicator may be reset by manually depressing the indicator button against the bias of the leaf spring to a position where the flange is secured beneath the ledge in the cover bore. A bimetal strip is provided to prevent movement of the leaf spring and release of the indicator button at low temperature levels, even if the piston magnet is located closely adjacent the thin wall section of the body.

DETAILED DESCRIPTION OF THE PREFERRED EMBODIMENT

Figure 1:
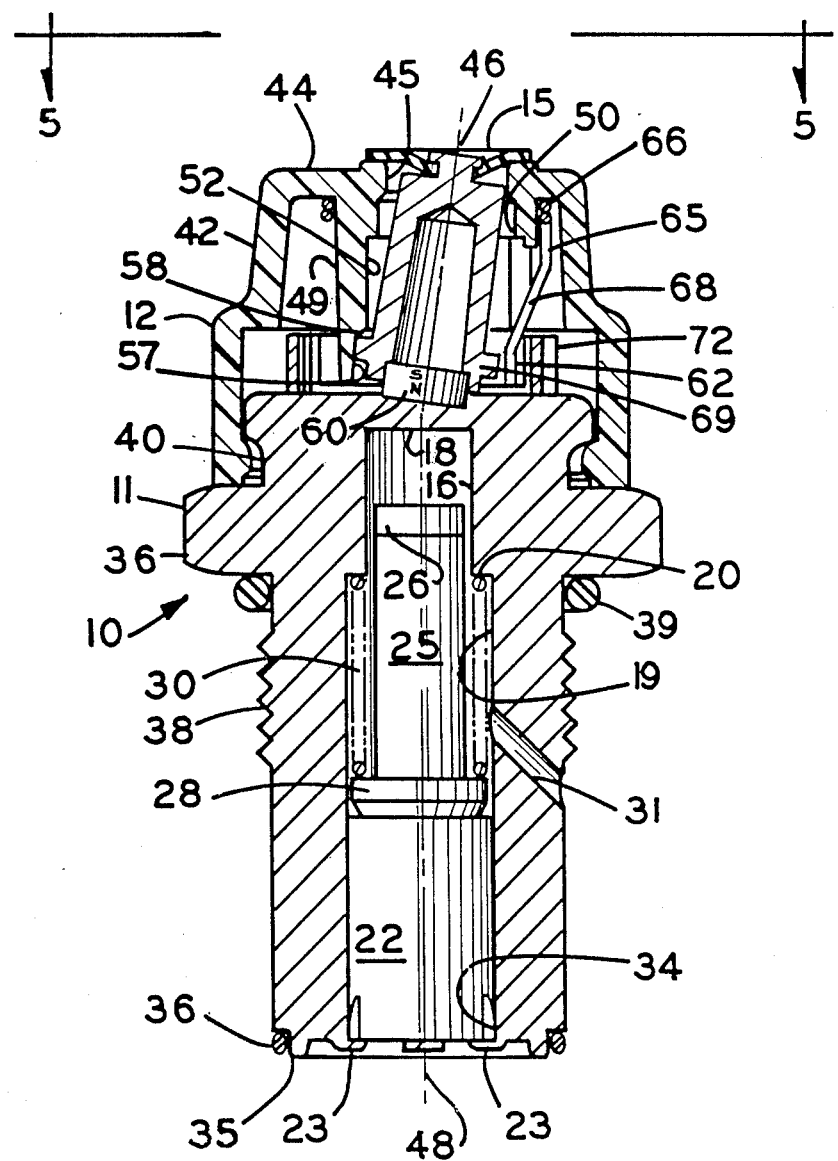
FIG. 1 is a cross sectional elevational view of a preferred embodiment of the invention showing the indicator button in a recessed position.

The preferred embodiment of the present invention is illustrated by way of example in the Figures of the drawing in both the stable and indicating positions. The differential pressure apparatus 10 consists essentially of a body member 11, a cover or housing 12, and indicator button 15. Body 11 is a cylindrical member having a central stop bore 16 therein terminating in a thin end wall 18 at the top of the body member. At the lower end of vertically disposed stop bore 16 is enlarged counter bore 19, forming an intermediate shoulder 20. Counter bore 19 extends to the open lower end of body member 11.

Cylindrical piston 22 is slidably received in counter bore 19 and is retained therein by a plurality of tabs 23 which are formed by bending over portions of the bottom surface of body member 11. Located above piston 22 is magnet support 25 which is a cylindrical structure adapted for a sliding movement upwardly into body bore 16. A permanent magnet 26, being a short cylindrical magnet having a north pole face oriented upwardly is affixed at the upper end of magnet support 25 for movement therewith toward and away from end wall 18. Magnet support 25 includes a lower peripheral flange 28 and a conventional coil spring 30 is disposed between flange 28 and shoulder 20 to urge magnet support 25 and piston 22 downwardly toward the open end of counter bore 19, to the position indicated in FIG. 1.

Duct 31 is provided in the side wall of body member 11 communicating with counter bore 19 at a location above the uppermost position of piston 22 to provide a path for fluid under pressure to the upper face of piston 22. Piston 22 includes an integral lip seal 34 at the lower portion thereof formed by a peripheral groove in the lower margin of piston 22. This provides a device for sealing against fluid pressure applied at the open end of counter bore 19 or at the lower face of piston 22. Preferably, piston 22 is formed of TEFLON plastic which provides a resilient lip seal 34 and a slippery surface for relatively free sliding movement within counter bore 19. Body member 11 includes a lower circular flange 35 at the bottom face thereof and a circumscribed o-ring 36 for sealing purposes. Body member 11 further includes a plurality of wrench flats 13 at a location intermediate its ends as well as external threads 38 for securing the apparatus 10 in a threaded bore of a fluid filter or the like. O-ring 39 is disposed below wrench flats 13 to provide a seal for the apparatus. Body member 11 further includes peripheral groove 40 adjacent its upper end for retaining the cover 12 thereon.

Located at the upper end of body member 11 is cover 12 which generally is of inverted cup configuration having peripheral sidewall 42 and upper end wall 44, the latter having an entrance bore 45 formed therein for slidable receipt of indicator button 15. As noted in the view of FIG. 1, the axis 46 of entrance bore 45 is offset slightly from the axis 48 of body bore 16 for purposes to be described hereafter. Cover 12 further comprises a generally central depending circular boss through which is formed entrance bore 45, an adjacent short step bore 50 and a lower, enlarged counter bore 52. An inner peripheral lip 53 is formed at the bottom edge of cover 12 for engagement in groove 40 of body member 11.

Figure 3:
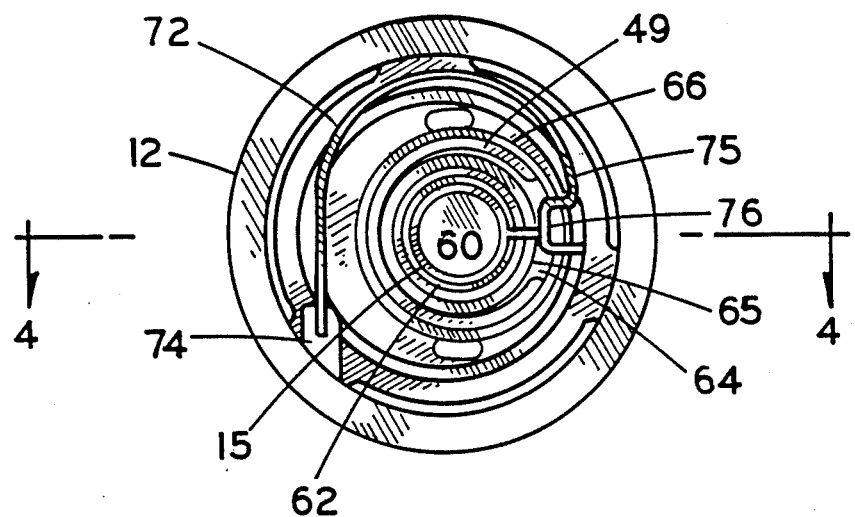
FIG. 3 is an enlarged bottom view of the cover portion only of the differential pressure indicator with the indicator button in the recessed position.

As best seen in FIG. 3 boss 49 includes a vertical opening 55 therein extending the length of counter bore 52. Opening 55 is on the order of 60 degrees of angular width and is formed between the spaced ends of boss 49. Near the lower end of counter bore 52 and opposite opening 55 is recess 57 forming a shoulder or ledge 58 in the inner surface of counter bore 52 which serves as a detent. Recess 57 is a semicircular groove extending approximately 180 degrees in angular extent and blending into the sidewall of counter bore 52.

Indicator button 15 is a cylindrical member having a central stop bore therein and fixedly supports a permanent magnet 60 in a counter bore at the lower end thereof. Magnet 60 is a small cylindrical magnet, poled magnetically opposite to that of piston magnet 26, with the north pole therefore facing downwardly so as to be repelled by piston magnet 26. Indicator button 15 further includes peripheral flange 62 at the lower portion thereof slightly above the end face, which flange 62 is received in recess 57 of counter bore 52 to be located beneath ledge 58 as depicted in FIG. 1. Leaf spring 65 is provided for urging indicator button into the position shown. Leaf spring 65 is a length of circular wire formed in a plurality of coils 66 at its upper end, a depending lower angular section 68 and terminating in an end bend 69. Coils 66 of leaf spring 55 surround boss 49 to support spring 65 in the position indicated with angular bend 68 thereon extending through opening 55 so that the end bend 69 thereof is in engagement with peripheral flange 62 of indicator button 15, urging the latter to the tilted position depicted in FIG. 1.

Figure 4:
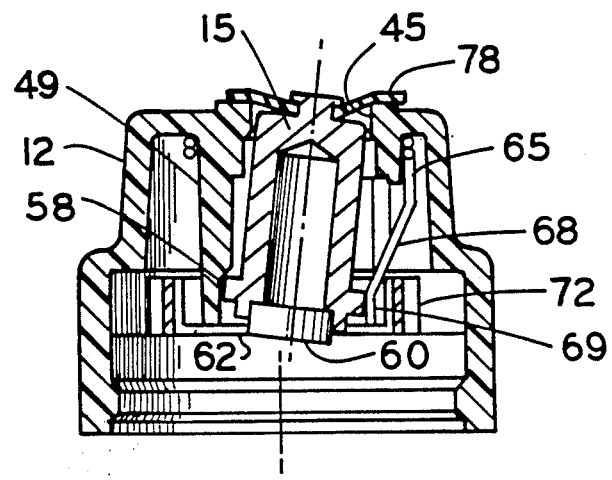
FIG. 4 is an enlarged sectional view of the cover portion only taken along the lines 4—4 of FIG. 3.
Figure 5:
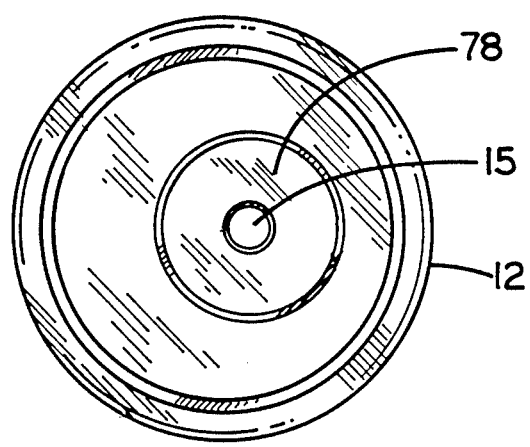
FIG. 5 is plan view of the cover portion only taken along the lines 5—5 of FIG. 1.

Still further, the differential pressure apparatus 10 comprises bimetal strip 72 in the form of a semicircle having one end supported in a chordal boss 74 in the inner surface of cover 12 and its free end 75 formed in an inwardly projected dogleg bend having a tangential flat portion 76 thereon engageable with leaf spring 65. As best seen in FIGS. 1, 3 and 4 bimetal strip 72 may be positioned closely adjacent or in engagement with leaf spring 65 when in a contracted condition at low temperature levels. In this condition, bimetal strip 72 will resist outward movement of leaf spring 65. At higher temperature levels, bimetal strip will expand to a greater diameter as best indicated in FIG. 2, to a position further outwardly of boss 49, to allow leaf spring 65 relatively free radial outward movement.

Thus, it will be apparent that the following action of the differential pressure apparatus 10 takes place. When in the normal deactuated condition piston 22 is at the lower end of counter bore 19, being urged thereto by coil spring 30, placing piston magnet 20 at its lowermost position in bore 16. Indicator button 15 is in a recessed position within cover 12 with flange 62 in engagement with ledge 58 being urged to and retained in this position by the lateral force applied by leaf spring 55. In this condition indicator button 15 will be stable and relatively immune to high levels of disturbing force induced by vibration or the like.

Figure 2:
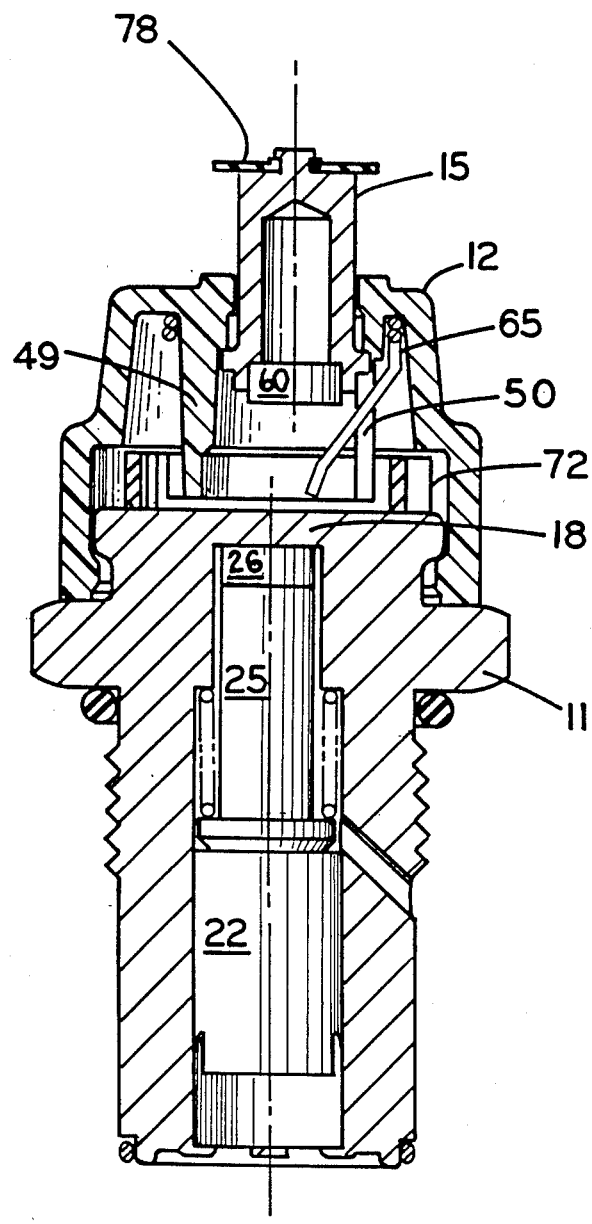
FIG. 2 is a cross sectional elevational view of the pressure indicator of the invention showing the indicator button in the visible position.

When differential piston 22 is moved to an upper position as depicted in FIG. 2, by the influence of a large differential pressure applied by way of duct 31 and the open lower end of counter bore 19, magnet 26 will be moved into close adjacency or contact with end wall 18. Body member 11 is preferably formed of nonmagnetic aluminum material and end wall 18 is relatively thin so that magnet 26 and indicator magnet 60 will be positioned closely adjacent one another. The upward repelling force of piston magnet 26 will urge indicator magnet 60 twist and move upwardly toward entrance bore 45. Since indicator button 15 is restrained by ledge 58, it is initially only capable of angular movement against the bias of spring 65. The magnetic repelling force thus will urge indicator button away from its tilted position toward a position more aligned with the axis of body 16 and entrance bore 45, thereby forcing leaf spring 65 laterally outwardly of opening 55 in boss 49. Preferably ledge 58 and the upper rim of flange 62 are slightly beveled to facilitate such disconnection. Once flange 62 is released from ledge 58 further magnetic repelling force from piston magnet 26 will urge indicator button rapidly upwardly and out of entrance bore 45 to the extended position depicted in FIG. 2. During this movement indicator button 15 will be aided by engagement with the angle-portion 68 of leaf spring 65 which will tend to move back inwardly within boss 49 to the position indicated in FIG. 2. While indicator button 15 may be retained in its uppermost position under the repelling influence of piston magnet 26 as depicted in FIG. 2, once piston 22 has been returned to a lowered position due to loss of fluid pressure on the lower face thereof, indicator button 15 will drop down only slightly into engagement with leaf spring 65 and be retained substantially in the position indicated. It will be apparent then that indicator button 15 may be returned to its stable position by manually depressing same against the bias of leaf spring 65 which in turn will urge flange 62 beneath ledge 58 and indicator button to the tilted position of FIG. 1. Preferably, indicator button includes an elastomeric disc 78 at the top portion thereof which serves as a dust seal for cover 12 when indicator button 15 is in its retracted position.

While the present invention has been disclosed in connection with the preferred embodiment thereof it should be understood that there may be other embodiments which fall within the spirit and scope of the invention as defined by the following claims.

We claim:
1. A pressure indicator for hydraulic filters and the like, comprising
   a body member having a central stop bore, said bore having an open end and a closed end,
   a piston slidable in said bore,
   a spring biasing said piston toward the open end of said bore, said piston being responsive to fluid pressure to move against the bias of said spring to the closed end of said bore,
   a magnet supported on said piston for movement therewith,
   a housing on said body member, said housing including a ledge,
   an indicator member in said housing slidable between a position recessed in said housing and an extended visible position, said indicator including a flange, said flange engageable with the ledge,
   a detent spring urging said flange into engagement with the ledge,
   a magnet carried by said indicator, said indicator magnet being external of said body member and adjacent said closed end of said bore when said indicator is recessed in said housing, said indicator magnet being repelled by said piston magnet to disengage said ledge and said flange and move said indicator to the extended position.

2. The pressure indicator of claim 1 wherein said detent spring is a leaf spring engageable with said indicator member in said recessed and said extended positions for urging said indicator member flange into engagement with said ledge when said indicator is in the recessed position, and toward said extended position when said ledge and flange are disengaged.

3. The pressure indicator of claim 2 wherein said body member is made of nonmagnetic material and includes a thin wall section at the end of said stop bore, against which said indicator member is disposed in said recessed position.

4. The pressure indicator of any one of claims 1-3 further comprising a bimetal strip engageable with said detent spring at low temperature levels and separated therefrom at high temperature levels to prevent and allow release of said indicator member from said detent.

5. A differential pressure indicator for hydraulic filters and the like, comprising
   a cylindrical body member having a central bore therein and a thin wall section closing one end of said bore, the other end of said bore being open and adapted for exposure to fluid under pressure,
   a piston slidable in said bore,
   a spring biasing said piston to said open end,
   a duct in said body member for communicating fluid under pressure to said closed end of said bore for establishing differential fluid pressure against said piston to move said piston to said closed end of said bore,
   a cover secured to said body member over said thin wall section, said cover having a bore therein aligned generally parallel to said body member bore,
   a cylindrical indicator button slidable in said cover bore between a recessed position within said cover and an extended position external of said cover,
   a flange on said indicator button on the lower portion thereof, a recess in said cover bore forming a shoulder engageable by said indicator flange for releaseably retaining said indicator button, a first magnet supported on said piston for movement therewith to positions spaced from and adjacent said thin wall section, a second magnet supported in said indicator button for moving the latter indicator button under repulsive magnetic force from said first magnet, said second magnet being operative to release said flange from said shoulder and move said indicator button to said extended position, and spring means urging said flange into engagement with said shoulder when said indicator button is in said recessed position.

6. The pressure indicator of claim 5 wherein the axis of said cover bore is offset from the axis of said body bore and said indicator button is tilted at an angle with respect to both said axes when in said recessed position.

7. The pressure indicator of claim 6 wherein said second magnet is closely adjacent said thin wall section when said indicator button is in said recessed position.

8. The pressure indicator of claim 8 wherein said piston comprises tetrafluoroethylene fluorocarbon polymers or fluorinated ethylene-propylene resins and said piston includes an integral lip seal at the lower portion thereof.

9. The pressure indicator of claim 8 wherein said body member is externally threaded for engagement in a threaded bore and further comprising wrench flats thereon.

10. The pressure indicator of claim 9 wherein said body member is formed of aluminum.

11. The pressure indicator of any one of claims 5-10 wherein said spring means urging said flange into engagement with said shoulder is a leaf spring and further comprising a semicircular bimetal strip having a free end adjacent said leaf spring for preventing movement of the latter and release of said indicator button at low temperature levels.

12. A pressure indicator for hydraulic filters and the like comprising:

an indicator body, said body including a central bore, said bore having an open end and a closed end;

a piston mounted for movement in said bore;

a spring means for biasing said piston toward the open end of said bore, said piston moveable against the bias of said spring means toward the closed end of said bore responsive to fluid pressure;

a first magnet mounted on said piston and moveable therewith;

an indicator member mounted for movement on said indicator body, said indicator member moveable generally in a first direction from a retracted position to an extended position, said indicator member including a projecting portion, said projecting portion extending generally perpendicular of said first direction, said projecting portion engageable by projecting portion engaging means on said indicator body for engaging said projecting portion when said indicating member is in the retracted position;

a detent spring biasing said projecting portion of said indicator member into engagement with said projecting portion engaging means; and a second magnet mounted on said indicator member, said second magnet adjacent said closed end of said bore when said indicator member is in the retracted position;

whereby when said piston is moved adjacent the closed end of said bore, said second magnet and first magnet are repelled, overcoming the force of said detent spring holding said projecting portion and said engaging means in engagement and moving said indicating member to the extended position.

13. A pressure indicator for hydraulic filters and the like comprising:

an indicator body, said body including a central bore, said bore having an open end and a closed end;

a piston mounted for movement in said bore;

spring means for biasing said piston toward the open end of said bore, said piston moveable against the bias of said spring means toward the closed end of said bore responsive to fluid pressure;

a first magnet mounted on said piston and moveable therewith;

an indicator member mounted for movement on said indicator body, said indicator member moveable generally in a first direction from a retracted position to an extended position, said indicator body including a projecting portion, said projecting portion extending generally perpendicular of said first direction, said projecting portion engageable by projecting portion engaging means on said indicator member for engaging said projecting portion when said indicating member is in the retracted position;

a detent spring biasing said projecting portion of said indicator body into engagement with said projecting portion engaging means; and a second magnet mounted on said indicator member, said second adjacent said closed end of said bore when said indicator member is in the retracted position;

whereby when said piston is moved adjacent the closed end of said bore, said second magnet and first magnet are repelled, overcoming the force of said detent spring holding said projecting portion and said engaging means in engagement and moving said indicating member to the extended position.

* * * * *